US007000233B2

(12) United States Patent
Levitan et al.

(10) Patent No.: US 7,000,233 B2
(45) Date of Patent: Feb. 14, 2006

(54) SIMULTANEOUS MULTITHREAD PROCESSOR WITH RESULT DATA DELAY PATH TO ADJUST PIPELINE LENGTH FOR INPUT TO RESPECTIVE THREAD

(75) Inventors: David Stephen Levitan, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 10/422,653

(22) Filed: Apr. 21, 2003

(65) Prior Publication Data

US 2004/0210742 A1 Oct. 21, 2004

(51) Int. Cl.
*G06F 9/46* (2006.01)

(52) U.S. Cl. .................. 718/107; 712/218; 712/229
(58) Field of Classification Search ................ 712/20, 712/229; 718/107

See application file for complete search history.

(56) References Cited

U.S. PATENT DOCUMENTS

2002/0138717 A1 * 9/2002 Joy et al. .................. 712/235
2003/0033509 A1 * 2/2003 Leibholz et al. ........... 712/228

* cited by examiner

*Primary Examiner*—Kenneth S. Kim
(74) *Attorney, Agent, or Firm*—Richard F. Frankeny; Winstead Sechrest & Minick P.C.; Casimer K. Salys

(57) ABSTRACT

An SMT system has a single thread mode and an SMT mode. Instructions are alternately selected from two threads every clock cycle and loaded into the IFAR in a three cycle pipeline of the IFU. If a branch predicted taken instruction is detected in the branch prediction circuit in stage three of the pipeline, then in the single thread mode a calculated address from the branch prediction circuit is loaded into the IFAR on the next clock cycle. If the instruction in the branch prediction circuit detects a branch predicted taken in the SMT mode, then the selected instruction address is loaded into the IFAR on the first clock cycle following branch predicted taken detection. The calculated target address is fed back and loaded into the IFAR in the second clock cycle following branch predicted taken detection. Feedback delay effectively switches the pipeline from three stages to four stages.

25 Claims, 4 Drawing Sheets

SIMULTANEOUS MULTITHREAD PROCESSOR WITH RESULT DATA DELAY PATH TO ADJUST PIPELINE LENGTH FOR INPUT TO RESPECTIVE THREAD

TECHNICAL FIELD

The present invention relates in general to methods and circuitry for a processor having simultaneous multithreading (SMT) and single thread operation modes.

BACKGROUND INFORMATION

For a long time, the secret to more performance was to execute more instructions per cycle, otherwise known as Instruction Level Parallelism (ILP), or decreasing the latency of instructions. To execute more instructions each cycle, more functional units (e.g., integer, floating point, load/store units, etc.) have to be added. In order to more consistently execute multiple instructions, a processing paradigm called out-of-order processing (OOP) may be used, and in fact, this type of processing has become mainstream.

OOP arose because many instructions are dependent upon the outcome of other instructions, which have already been sent into the processing pipeline. To help alleviate this problem, a larger number of instructions are stored in order to allow immediate execution. The reason this is done is to find more instructions that are not dependent upon each other. The area of storage used to store the instructions that are ready to execute immediately is called the reorder buffer. The size of reorder buffers have been growing in most modern commercial computer architectures with some systems able to store as many as 126 instructions. The reason for increasing the size of the reorder buffer is simple: code that is spatially related tends also to be temporally related in terms of execution (with the possible exclusion of arrays of complex structures and linked lists). The only problem is that these instructions also have a tendency to depend upon the outcome of prior instructions. With a CPU's ever increasing amount of required code, the only current way to find more independent instructions has been to increase the size of the reorder buffer.

However, using this technique has achieved a rather impressive downturn in the rate of increased performance and in fact has been showing diminishing returns. It is now taking more and more transistors to achieve the same rate of performance increase. Instead of focusing intently upon uniprocessor ILP extraction, one can focus upon a coarser form of extracting performance at the instruction or thread level, via multithreading (multiprocessing), but without the system bus as a major constraint.

The ability to put more transistors on a single chip has allowed on-chip multiprocessing (CMP). To take advantage of the potential performance increases, the architecture cannot use these multiple processors as uniprocessors but rather must use multiprocessing that relies on executing instructions in a parallel manner. This requires the programs executed on the CMP to also be written to execute in a parallel manner rather than in a purely serial or sequential manner. Assuming that the application is written to execute in a parallel manner (multithreaded), there are inherent difficulties in making the program written in this fashion execute faster proportional to the number of added processors.

The general concept behind using multiple cores on one die is to extract more performance by executing two threads at once. By doing so, the two CPUs together are able to keep a higher percentage of the aggregate number of functional units doing useful work at all times. If a processor has more functional units, then a lower percentage of those units may be doing useful work at any one time. The on-chip multiprocessor lowers the number of functional units per processor, and distributes separate tasks (or threads) to each processor. In this way, it is able to achieve a higher throughput on both tasks combined. A comparative uniprocessor would be able to get through one thread, or task, faster than a CMP chip could, because, although there are wasted functional units, there are also "bursts" of activity produced when the processor computes multiple pieces of data at the same time and uses all available functional units. One idea behind multiprocessors is to keep the individual processors from experiencing such burst activity times and instead have each processor use what resources it has available more frequently and therefore efficiently. The non-use of some of the functional units during a clock cycle is known as "horizontal waste," which CMP tries to avoid.

However, there are problems with CMP. The traditional CMP chip sacrifices single-thread performance in order to expedite the completion of two or more threads. In this way, a CMP chip is comparatively less flexible for general use, because if there is only one thread, an entire half of the allotted resources are idle and completely useless Oust as adding another processor in a system that uses a singly threaded program is useless in a traditional multiprocessor (MP) system). One approach to making the functional units in a CMP more efficient is to use course-grained multithreading (CMT). CMT improves the efficiency with respect to the usage of the functional units by executing one thread for a certain number of clock cycles. The efficiency is improved due to a decrease in "vertical waste." Vertical waste describes situations in which none of the functional units are working due to one thread stalling.

When switching to another thread, the processor saves the state of that thread (i.e., it saves where instructions are in the pipeline, which units are being used) and switches to another one. It does so by using multiple register sets. The advantage of this is due to the fact that often a thread can only go for so long before it falls upon a cache miss, or runs out of independent instructions to execute. A CMT processor can only execute as many different threads in this way as it has support for. So, it can only store as many threads as there are physical locations for each of these threads to store the state of their execution. An N-way CMT processor would therefore need to have the ability to store the state of N threads.

A variation on this concept would be to execute one thread until it has experienced a cache miss (usually a L2 (secondary) cache miss), at which point the system would switch to another thread. This has the advantage of simplifying the logic needed to rotate the threads through a processor, as it will simply switch to another thread as soon as the prior thread is stalled. The penalty of waiting for a requested block to be transferred back into the cache is then alleviated. This is similar to the hit under miss (or hit under multiple miss) caching scheme used by some processors, but it differs because it operates on threads instead of upon instructions. The advantages of CMT over CMP are CMT does not sacrifice single-thread performance, and there is less hardware duplication (less hardware that is halved to make the two processors "equal" to a comparable CMT).

A more aggressive approach to multithreading is called fine-grained multithreading (FMT). Like CMT, the basis of FMT is to switch rapidly between threads. Unlike CMT, however, the idea is to switch each and every cycle. While both CMT and FMT actually do indeed slow down the completion of one thread, FMT expedites the completion of all the threads being worked on, and it is overall throughput which generally matters most.

CMPs may remove some horizontal waste in and unto themselves. CMT and FMT may remove some (or all) vertical waste. However an architecture that comprises an advanced form of multithreading, referred to as Simultaneous Multithreading (SMT), may be used to reduce both horizontal and vertical waste. The major goal of SMT is to have the ability to run instructions from different threads at any given time and in any given functional unit. By rotating through threads, an SMT architecture acts like an FMT processor, and by executing instructions from different threads at the same time, it acts like CMP. Because of this, it allows architects to design wider cores without the worry of diminishing returns. It is reasonable for SMT to achieve higher efficiency than FMT due to its ability to share "unused" functional units among differing threads; in this way, SMT achieves the efficiency of a CMP machine. However, unlike a CMP system, an SMT system makes little to no sacrifice (the small sacrifice is discussed later) for single threaded performance. The reason for this is simple. Whereas much of a CMP processor remains idle when running a single thread and the more processors on the CMP chip makes this problem more pronounced, an SMT processor can dedicate all functional units to the single thread. While this is obviously not as valuable as being able to run multiple threads, the ability to balance between single thread and multithreaded environments is a very useful feature. This means that an SMT processor may exploit thread-level parallelism (TLP) if it is present, and if not, will give full attention to instruction level parallelism (ILP).

In order to support multiple threads, an SMT processor requires more registers than the traditional superscalar processor. The general aim is to provide as many registers for each supported thread as there would be for a uniprocessor. For a traditional reduced instruction set computer (RISC) chip, this implies 32 times N registers (where N is the number of threads an SMT processor could handle in one cycle), plus whatever renaming registers are required. For a 4-way SMT processor RISC processor, this would mean 128 registers, plus however many renaming registers are needed.

Most SMT models are straightforward extensions of a conventional out-of-order processor. With an increase in the actual throughput comes more demands upon instruction issue width, which should be increased accordingly. Because of the aforementioned increase in the register file size, an SMT pipeline length may be increased by two stages (one to select register bank and one to do a read or write) so as not to slow down the length of the clock cycle. The register read and register write stages are therefore both broken up into two pipelined stages.

In order to not allow any one thread to dominate the pipeline, an effort should be made to ensure that the other threads get a realistic slice of the execution time and resources. When the functional units are requesting work to do, the fetch mechanism will provide a higher priority to those threads that have the fewest instructions already in the pipeline. Of course, if the other threads have little they can do, more instructions from the thread are already dominating the pipelines.

SMT is about sharing whatever possible. However, in some instances, this disrupts the traditional organization of data, as well as instruction flow. The branch prediction unit becomes less effective when shared, because it has to keep track of more threads with more instructions and will therefore be less efficient at giving an accurate prediction. This means that the pipeline will need to be flushed more often due to miss prediction, but the ability to run multiple threads more than makes up for this deficit.

The penalty for a misprediction is greater due to the longer pipeline used by an SMT architecture (by two stages), which is in turn due to the rather large register file required. However, techniques have been developed to minimize the number of registers needed per thread in an SMT architecture. This is done by more efficient operating system (OS) and hardware support for better deallocation of registers, and the ability to share registers from another thread context if another thread is not using all of them.

Another issue is the number of threads in relation to the size of caches, the line sizes of caches, and the bandwidth afforded by them. As is the case for single-threaded programs, increasing the cache-line size decreases the miss rate but also increases the miss penalty. Having support for more threads which use more differing data exacerbates this problem and thus less of the cache is effectively useful for each thread. This contention for the cache is even more pronounced when dealing with a multiprogrammed workload over a multithreaded workload. Thus, if more threads are in use, then the caches should be larger. This also applies to CMP processors with shared L2 caches.

The more threads that are in use results in a higher overall performance and the differences in association of memory data become more readily apparent. There is an indication that when the L1 (primary) cache size is kept constant, the highest level of performance is achieved using a more associative cache, despite longer access times. Tests have been conducted to determine performance with varying block sizes that differ associatively while varying the numbers of threads. As before, increasing the associative level of blocks increased the performance at all times; however, increasing the block size decreased performance if more than two threads were in use. This was so much so that the increase in the degree of association of blocks could not make up for the deficit caused by the greater miss penalty of the larger block size.

Some portions of the SMT processor may be implemented as pipeline units to keep from having to increase the clock cycle. For example, a pipeline may be implemented for the circuitry that loads an instruction fetch address register (IFAR), accesses cache memory with the fetched address, and does prediction if an accessed instruction is a branch instruction (branch prediction logic). When an instruction is a branch instruction, it is valuable to predict if it is a branch taken so that the next "target" instruction after the branch may be loaded from cache. Once the branch prediction logic in the pipeline predicts that the branch is taken, it calculates the target address of the next instruction in the branch path. For a single thread, the IFAR and the Cache line would be flushed and the IFAR would be loaded with the calculated target address for the predicted taken branch instruction. In this case, instructions for the single thread would remain in program order based on the branch instruction being a taken branch. The pipeline for this operation would obviously be optimized for single thread operation.

In the SMT mode, instructions are loaded into the IFAR at the input of the pipeline alternately from each of two threads, thread zero (T0) and thread one (T1). If a condition occurs such as a branch predicted taken for T0, then the feedback to the IFAR will naturally occur a number of clock cycles later depending on the length of the pipeline. It is important at this time to keep instructions from T0 and T1 in program order; therefore, it is important that a feedback from processing an instruction from T0 not affect the order of the instructions from T1 and vice versa. This may, in affect, require the pipeline to have a different cycle length in the SMT mode than in the single thread mode. There is, therefore, a need for a method and circuitry that configures an SMT system so that a pipeline process is synchronized for receiving inputs from the correct one of multiple threads in the SMT mode and optimized for the fastest operation in an application executing single threads.

SUMMARY OF THE INVENTION

An instruction fetch unit (IFU) has a three clock cycle pipeline where the pipeline comprises circuitry for loading the instruction fetch address register (IFAR), for accessing the instruction cache (I-Cache), and circuitry for determining whether the instruction is a branch instruction that is predicted taken. In an SMT mode, the IFAR is alternately loaded from the program counter of thread zero (T0) and then from the program counter of thread one (T1) on alternate cycles of the clock. When a branch instruction is loaded from one thread (e.g., T0), the branch prediction circuitry does not determine that the branch is predicted taken and does not calculate the target address (next instruction in the branch path) until the third clock cycle (three cycle pipeline). In the single thread mode, the target address is loaded into the IFAR on the fourth clock cycle which is the next clock cycle following detection of a branch instruction that was predicted taken. However, since the pipeline is three cycles, this interferes with a normal load for T1 in the SMT mode. In an embodiment of the present invention, feedback of the target address from the branch prediction logic is delayed one clock cycle, if the SMT mode is selected and a branch predicted taken is detected, insuring that the target address is loaded into the IFAR during the cycle for T0, thus not interfering with T1. The present invention effectively switches the pipeline from a three cycle pipeline for the single thread mode to a four cycle pipeline for the SMT mode.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
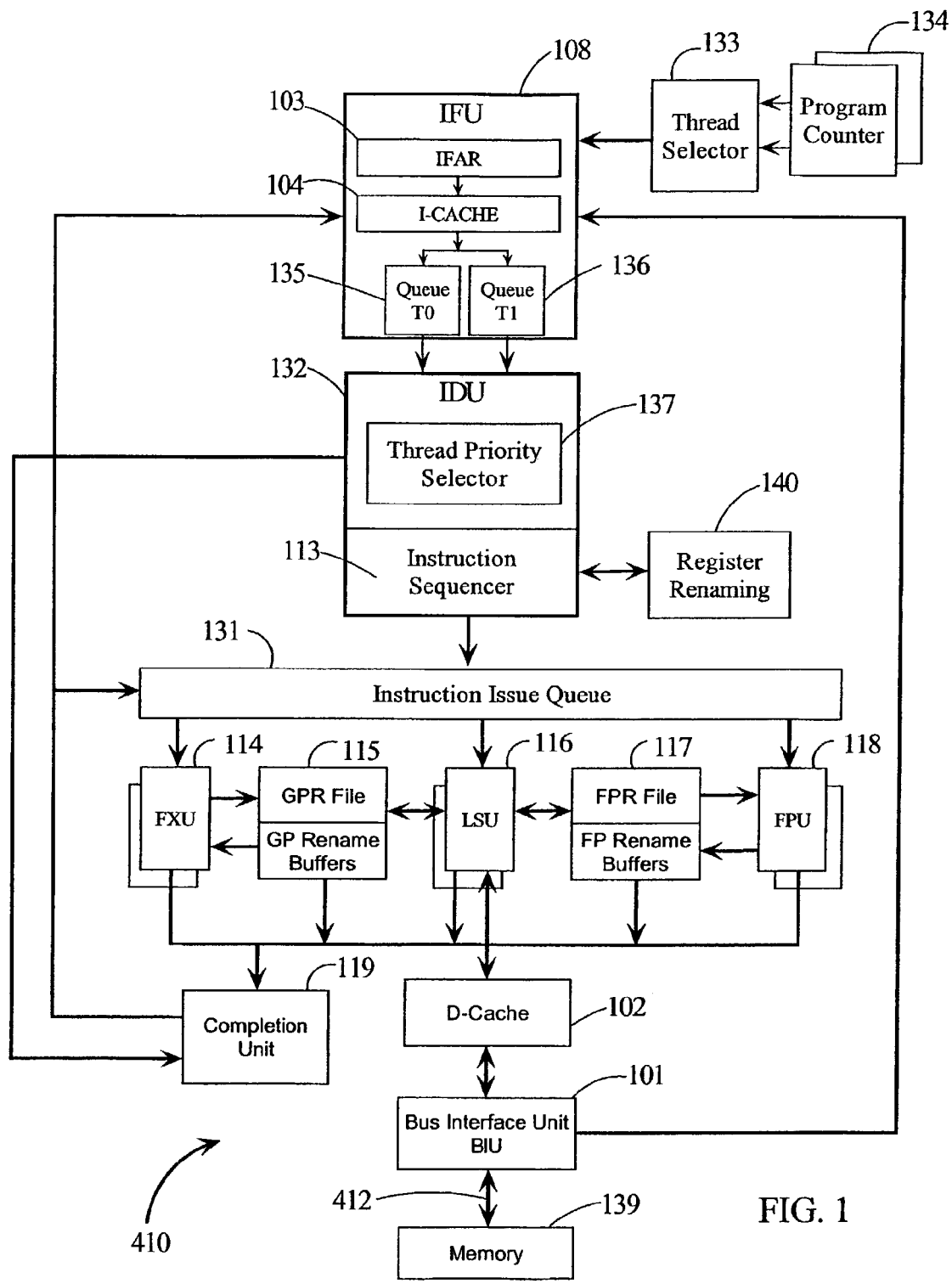
FIG. 1 is a block diagram of functional units in an SMT processor according to embodiments of the present invention.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there are illustrated details of CPU 410. CPU 410 is designed to execute multiple instructions per clock cycle. Thus, multiple instructions may be executing in any of the execution units, fixed point units (FXUs) 114, floating point units (FPUs) 118, and load/store units (LSUs) 116 during any one clock cycle. Likewise, CPU 410 may simultaneously execute instructions from multiple threads in an SMT mode.

Program counters (PCs) 134 correspond to thread zero (T0) and thread one (T1) that have instructions for execution. Thread selector 133 alternately selects between T0 and T1 to couple an instruction address to instruction fetch unit (IFU) 108. Instruction addresses are loaded into instruction fetch address register (IFAR) 103. IFAR 103 alternately fetches instructions for each thread from instruction cache (I-Cache) 104. Instructions are buffered in instruction queue (IQ) 135 for T0 and IQ 136 for T1. IQ 135 and IQ 136 are coupled to instruction dispatch unit (IDU) 132. Instructions are selected and read from IQ 135 and IQ 136 under control of thread priority selector 137. Normally, thread priority selector 137 reads instructions from IQ 135 and IQ 136 substantially proportional to each thread's program controlled priority.

The instructions are decoded in a decoder (not shown) in IDU 132. Instruction sequencer 113 then may place the instructions in groups in an order determined by various algorithms. The groups of instructions are forwarded to instruction issue queue (IIQ) 131. The instruction sequencer 113 receives instructions from both threads in program order, but the instructions may be issued from the IIQ 131 out of program order and from either thread. The general purpose register (GPR) file 115 and floating point register (FPR) file 117 are used by multiple executing units and represent the program state of the system. These hardware registers may be referred to as the "architected" registers. When an instruction is put into an issue queue, each architected register is renamed. Each architected register that is being modified is assigned a physical register and a corresponding look-up table identifies physical registers that are associated with an architected register. Therefore in the issue queue, the architected register has been renamed so that multiple copies of an architected register may exist at the same time. This allows instructions to be executed out-of-order as long as source operands are available. Register renaming unit 140, renames and maps the registers so that unused physical registers may be reassigned when all instructions referencing a particular physical register complete and the physical register does not contain the latest architected state.

Instructions are queued in IIQ 131 for execution in the appropriate execution unit. If an instruction contains a fixed point operation, then any of the multiple fixed point units (FXUs) 114 may be used. All of the execution units, FXU 114, FPU 118 and LSU 116 are coupled to completion unit 119 that has completion tables (not shown) indicating which of the issued instructions have completed and other status information. Information from completion unit 119 is forwarded to IFU 108. IDU 132 may also send information to completion unit 119. Data from a store operation from LSU 116 is coupled to data cache (D-Cache) 102. This data may be stored in D-Cache 102 for near term use and/or forwarded to bus interface unit (BIU) 101 which sends the data over bus 412 to memory 139. LSU 116 may load data from D-Cache 102 for use by the execution units (e.g., FXU 114).

Figure 2:
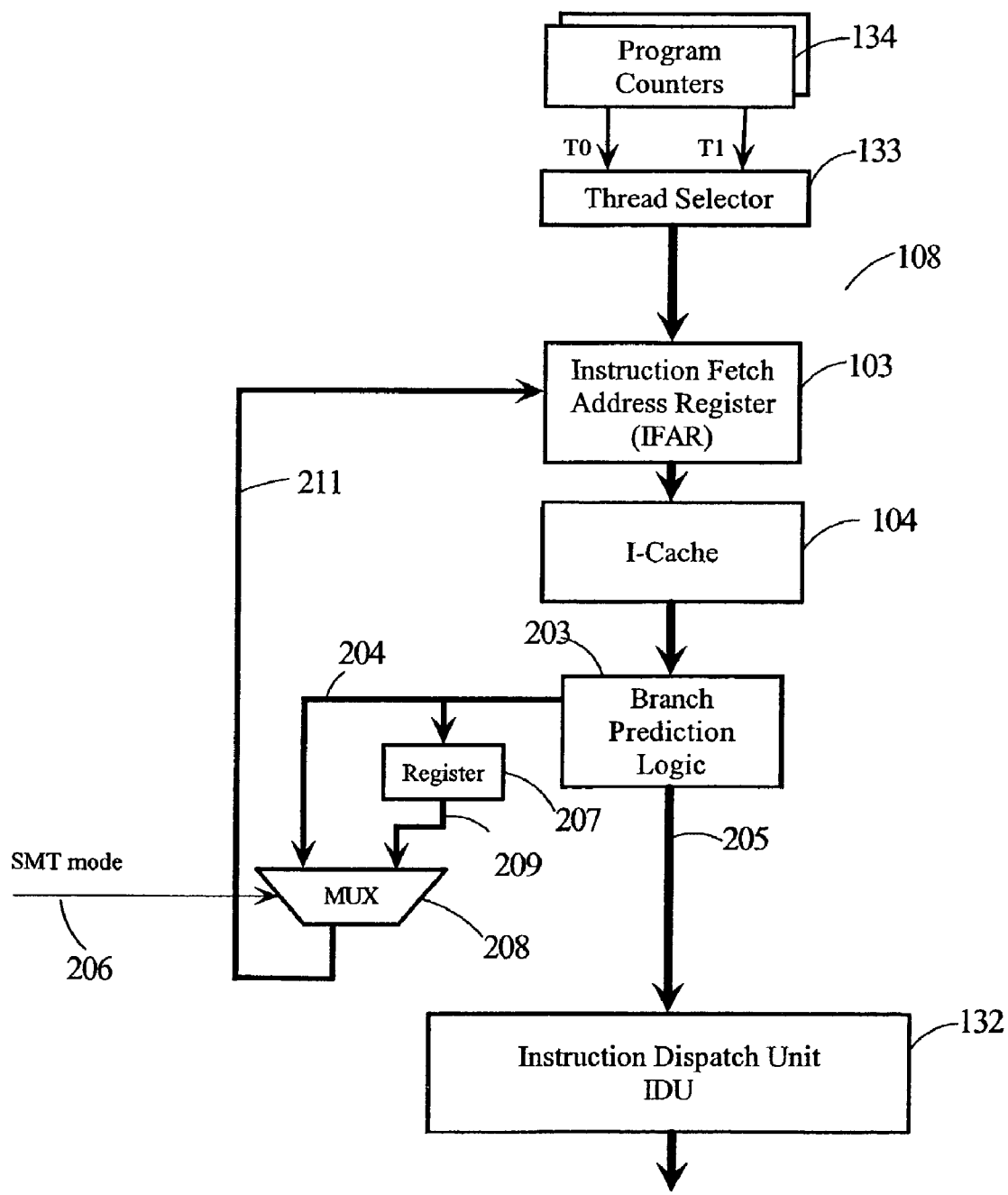
FIG. 2 is a block diagram of circuitry for implementing method steps of embodiments of the present invention.

FIG. 2 is a block diagram of details of IFU 108 according to embodiments of the present invention. Program counters 134 correspond to threads being executed in processor 410. In the SMT mode, thread selector 133 is toggled every clock cycle to alternately select an instruction address from T0 and T1. IFAR 103 is generally loaded every clock cycle in this manner, loading sequential addresses unless there is some older instruction (from an address previously loaded) that forces a re-direct in which case the IFAR 103 is loaded from another source. In fact, there may be several sources for loading IFAR 103 which are not discussed relative to the present invention.

IFU 108 has a three cycle pipeline comprising loading IFAR 103, accessing I-Cache 104, and determining whether the instruction is a predicted branch taken in branch logic 203. If branch prediction logic 203 detects a branch instruction that is predicted taken, then it calculates a target address that is written into the IFAR so that the next instruction corresponding to the taken path can be accessed from I-Cache 104. In the single thread mode, output 204 would directly couple to input 211 the target address and control signals for IFAR 103. In this case, the IFAR 103 is loaded with the target address from branch prediction logic 203 on the next clock cycle following detection of a branch predicted taken by branch prediction circuit 203. Instructions that were sequential to the branch instruction are flushed.

In the SMT mode, IFAR 103 is alternately loaded from the program counter of T0 and then from the program counter of T1. Every other cycle is assigned to a particular thread. To maintain program instruction order, this protocol must be maintained. In the SMT mode, if branch prediction logic 203 detects a branch instruction from T0 that is predicted taken and couples the target address to IFAR 103 directly from input 204, then its load would fall in the cycle of T1. Loading IFAR 103 under these conditions would corrupt program instruction order.

To solve this problem, a means for extending the feedback stage one clock cycle is added. MUX 208 and register 207 are added. MUX 208 selects input 204 or input 209 under control of SMT mode signal 206. If the SMT mode is not selected, signal 206 selects input 204 to couple the target address and any control signals directly to input 211 of IFAR 103. The control signals coupled to input 211 indicate whether the IFAR should be loaded with a target address. If the SMT mode is selected, then signal 206 selects input 209 to couple to input 211 of IFAR 103. Register 207 receives the control signals and the target address which inserts a one cycle delay in the feedback path effectively increasing the pipeline one stage during the SMT mode when a branch is predicted taken in branch prediction logic 203.

Figure 3:
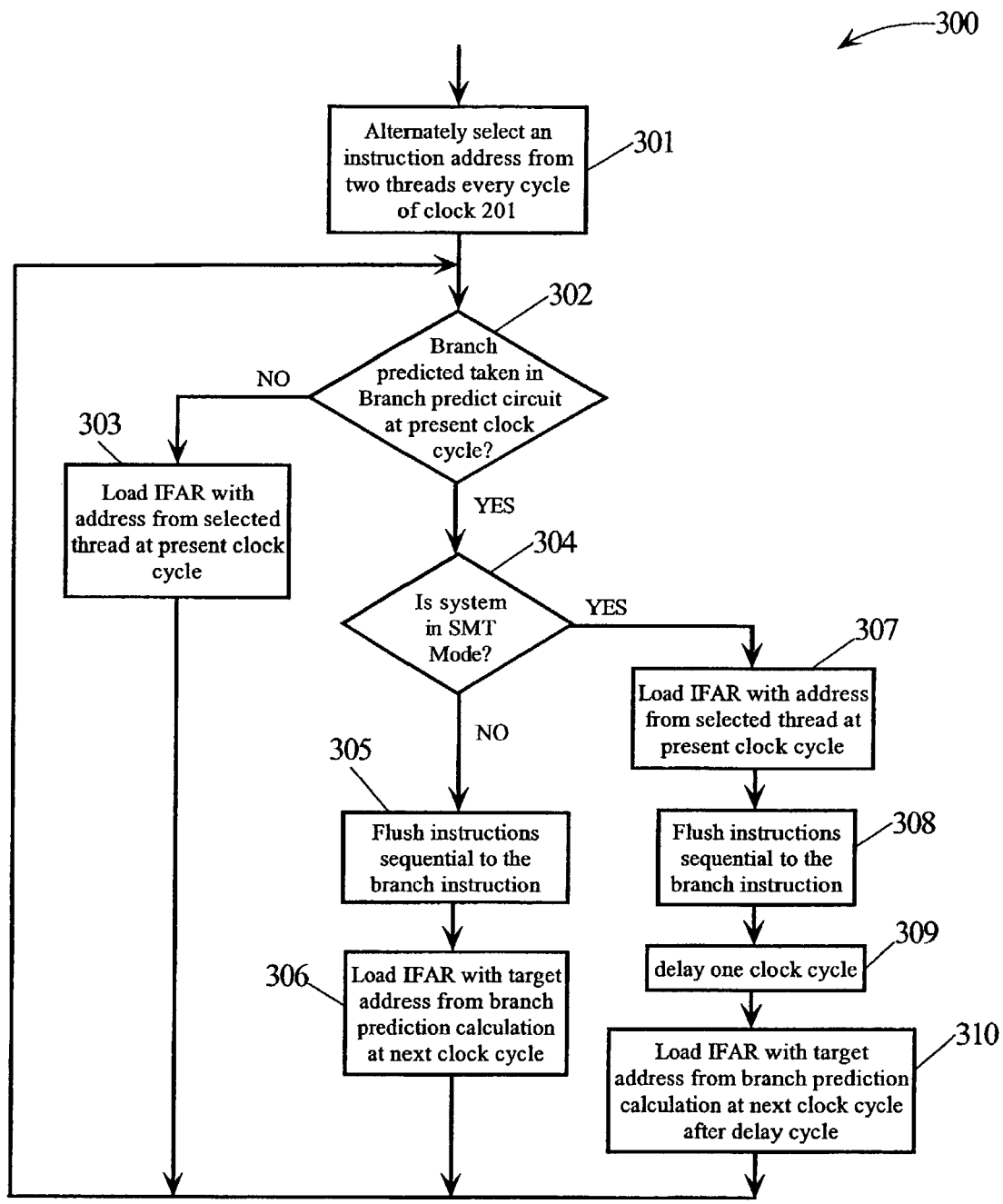
FIG. 3 is a flow diagram of method steps according to embodiments of the present invention.

FIG. 3 is a flow diagram of method steps in an embodiment of the present invention. In step 301, instruction addresses are alternately selected from two threads every cycle of clock 201 and coupled to the input of IFAR 103. This selection process is independent of what else is happening in the pipeline stage comprising the IFAR, I-Cache, and branch prediction logic. In step 302, during the present clock cycle a test is done to determine if the branch prediction circuit has detected a branch instruction predicted taken. The branch instruction would have resulted from a address loaded to IFAR 103 two clock cycles earlier. If the result of the test is NO, then the IFAR 103 is simply loaded with an address from a selected thread at the input of the IFAR 103. Steps 302 and 303 repeat awaiting feedback from the branch prediction circuit 203 in the third pipeline stage indicated a branch predicted taken has been detected. If the result of the test in step 302 is YES, then the branch prediction circuit has detected a branch predicted taken and has calculated a target address for the taken path. Depending on whether the SMT mode or the single thread mode is selected different operations ensue. In step 304, a test is done to determine if the SMT mode is selected. If the SMT mode is not selected, then the feedback process of the single thread mode is executed in step 305 where a Flush cycle flushes IFAR 103 and the cache line for the single thread. Then, in step 306, IFAR 103 is loaded with the target address from the branch prediction circuit in the next clock cycle following detection of a branch predicted taken. If the result of the test in step 304 is YES, then the SMT mode is set and a branch predicted taken has been detected (e.g., from T0). In this case, IFAR 103 is loaded with the address from the present selected thread (also T0) at the present clock cycle. In step 308, the instructions sequential to the branch instruction predicted taken are flushed. In step 309, the feedback of the target address and any control signals are delayed one clock cycle via register 207. The next clock cycle following a detection of a branch predicted taken in branch prediction logic 203 is the cycle for T1 and not T0 which produced the detected branch predicted taken. To insure that the program sequence is maintained at this point in the processing, the one cycle of delay insures that the feedback is synchronized in the SMT mode. Register 207 adds one cycle of delay in the SMT mode for a branch predicted taken effectively increasing the pipeline one stage. In the single thread mode or in SMT where no branch is predicted taken, the pipeline remains three stages. In step 310, the IFAR 103 is loaded with the target address calculated by branch prediction logic 203 at the next clock cycle following the delay cycle. Following step 310, a branch is taken back to step 302.

In the method of FIG. 3, step 303 is executed if the result of the test is NO in step 302 indicating that no branch instruction predicted taken has been detected. Actual operation of IFAR 103 may be more complex when considering all instruction cases. Every case was not considered to simplify explanation of the present invention. For example, instructions fetched in response to the address in IFAR 103 are stored in instruction Queue 135 for T0 and instruction Queue 136 for T1. In one embodiment of the present invention, if there is room for fetched instructions in Queue 135 and 136, the IFAR 103 is incremented by the number of instructions that are fetched in parallel (e.g., eight instructions may be fetched at one time on a 32 byte boundary). In case there is no room for current fetched instructions in Queue 135 or 136, then IFAR 103 is held. However, this may only be true if there is no older instruction that is feeding back an address from a later pipeline stage. Such cases would occur when, a branch instruction was miss-predicted, an instruction that generated an exception condition or needed to be re-executed, or there was an external interrupt.

Figure 4:
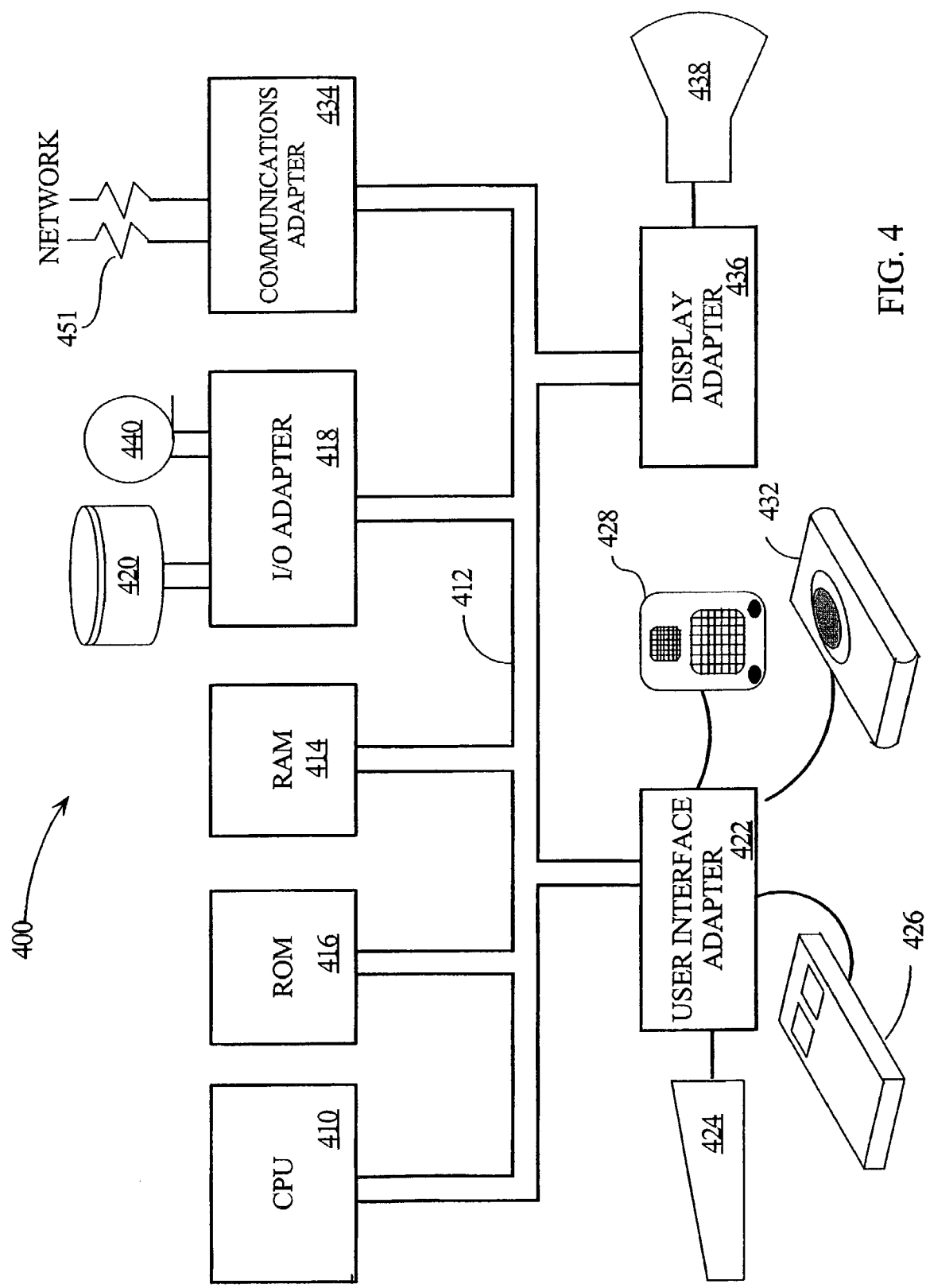
FIG. 4 is a representative hardware environment for practicing the present invention.

A representative hardware environment for practicing the present invention is depicted in FIG. 4, which illustrates a typical hardware configuration of a workstation in accordance with the subject invention having multiprocessor central processing unit (CPU) 410 and a number of other units interconnected via system bus 412. The workstation shown in FIG. 4 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, speaker 428, microphone 432, and/or other user interface devices such as a touch screen device (not shown) to bus 412, communication adapter 434 for connecting the workstation to a data processing network, and display adapter 436 for connecting bus 412 to display device 438.

Although the present invention and its advantages have been described in detail, it should be understood that various changes, substitutions and alterations can be made herein without departing from the spirit and scope of the invention as defined by the appended claims.

What is claimed is:

1. A method of operating a shared pipeline circuit for processing data for first and second threads in a simultaneous multithread (SMT) processor having an SMT mode and a single thread mode comprising:
    alternately loading an input stage of said shared pipeline circuit if said SMT mode is selected at an even clock cycle with data from said first thread and at an odd clock cycle with data from said second thread;
    generating first data for said first thread in a pipeline stage following said input stage;
    coupling said first data through a delay path to said input stage if said SMT mode is selected to synchronize loading said input stage with said first data during a subsequent even clock cycle; and
    coupling said first data directly back to said input stage if said single thread mode is selected.

2. The method of claim 1 further comprising the steps of:
    loading said first data into said input stage if a feedback signal from said pipeline stage has a first logic state; and
    loading said data from said first or second thread if said feedback signal has a second logic state.

3. The method of claim 1 further comprising the steps of:
    accessing first stored data from a cache memory corresponding to a first address data loaded into said input stage;
    decoding said first stored data generating first or second feedback data;
    generating said first logic state of said feedback signal if said decoding step generates said first feedback data; and
    generating said second logic state of said feedback signal if said decoding step generates said second feedback data.

4. The method of claim 1, wherein said delay path has a delay of at least one clock cycle of a clock signal controlling said shared pipeline circuit and alternately generating said even clock cycle and said odd clock cycle.

5. The method of claim 4, wherein said shared pipeline circuit has a cycle length corresponding to an integer multiple N cycles of said clock signal.

6. A simultaneous multithread (SMT) processor having an SMT mode and a single thread mode comprising:
    a shared pipeline circuit for processing data for first and second threads;
    circuitry for alternately loading an input stage of said shared pipeline circuit if said SMT mode is selected at an even clock cycle with data from said first thread and at an odd clock cycle with data from said second thread;
    circuitry for generating first data for said first thread in a pipeline stage following said input stage;
    circuitry for coupling said first data through a delay path to said input stage if said SMT mode is selected to synchronize loading said input stage with said first data during a subsequent even clock cycle; and
    circuitry for coupling said first data directly back to said input stage if said single thread mode is selected.

7. The processor of claim 6 further comprising:
    circuitry for loading said first data into said input stage if a feedback signal from said pipeline stage has a first logic state; and
    circuitry for loading said data from said first or second thread if said feedback signal has a second logic state.

8. The processor of claim 6 further comprising:
    circuitry for accessing first stored data from a cache memory corresponding to a first address data loaded into said input stage;
    circuitry for decoding said first stored data generating first or second feedback data;
    circuitry for generating said first logic state of said feedback signal if said decoding step generates said first feedback data; and
    circuitry for generating said second logic state of said feedback signal if said decoding step generates said second feedback data.

9. The processor of claim 6, wherein said delay path has a delay of at least one clock cycle of a clock signal controlling said shared pipeline circuit and alternately generating said even clock cycle and said odd clock cycle.

10. The processor of claim 9, wherein said shared pipeline circuit has a cycle length corresponding to N cycles of said clock signal.

11. A method for operating a decode and dispatch pipeline that alternately receives sequential instruction addresses from first and second instruction threads in a simultaneous multithread (SMT) processor having an SMT mode and a single thread mode comprising the steps of:
    alternately loading an instruction fetch address register (IFAR) of said decode and dispatch pipeline if said SMT mode is selected with an instruction address from said first thread at an even clock cycle and an instruction address from said second thread at an odd clock cycle;
    generating a target address in response to a decode of a first instruction of said first thread in a stage of said decode and dispatch pipeline following said IFAR;
    coupling said target address through a delay path to said IFAR if said SMT mode is selected to synchronize loading said IFAR with said target address during a subsequent even clock cycle; and
    coupling said target address directly to said IFAR if said single thread mode is selected.

12. The method of claim 11 further comprising the steps of:
    loading said target address into said IFAR if a feedback signal has a first logic state; and
    loading an instruction address from said first or second thread into said IFAR if said feedback signal has a second logic state.

13. The method of claim 11 further comprising the steps of:
    accessing a first instruction from an instruction cache memory corresponding to a first instruction address loaded into said instruction address register;
    determining if said first instruction is a branch instruction;

generating said first logic state of said feedback signal if said first instruction is a branch instruction predicted taken; and generating said second logic state of said feedback signal if said first instruction is not a branch instruction predicted taken.

14. The method of claim 11, wherein said delay path has a delay of at least one clock cycle of a clock signal controlling said decode and dispatch pipeline and alternately generating said even clock cycle and said odd clock cycle.

15. The method of claim 14, wherein said decode and dispatch pipeline has a cycle length corresponding to N cycles of said clock signal.

16. A simultaneous multithread (SMT) processor having an SMT mode and a single thread mode comprising:
- a shared dispatch and decode pipeline within said SMT processor;
- circuitry for alternately loading an instruction fetch address register (IFAR) of said decode and dispatch pipeline if said SMT mode is selected with an instruction address from said first thread at an even clock cycle and an instruction address from said second thread at an odd clock cycle;
- circuitry for generating a target address in response to a decode of a first instruction of said first thread in a stage of said decode and dispatch pipeline following said IFAR;
- circuitry for coupling said target address through a delay path to said IFAR if said SMT mode is selected to synchronize loading said IFAR with said target address during a subsequent even clock cycle; and
- circuitry for coupling said target address directly to said IFAR if said single thread mode is selected.

17. The processor of claim 16 comprising:
- circuitry for loading said target address into said IFAR if a feedback signal has a first logic state; and
- circuitry for loading an instruction address from said first or second thread into said IFAR if said feedback signal has a second logic state.

18. The processor of claim 16, further comprising:
- circuitry for accessing a first instruction from an instruction cache memory corresponding to a first instruction address loaded into said instruction address register;
- circuitry for determining if said first instruction is a branch instruction;
- circuitry for generating said first logic state of said feedback signal if said first instruction is a branch instruction predicted taken; and
- circuitry for generating said second logic state of said feedback signal if said first instruction is not a branch instruction predicted taken.

19. The processor of claim 16, wherein said delay path has a delay of at least one clock cycle of a clock signal controlling said decode and dispatch pipeline and alternately generating said even clock cycle and said odd clock cycle.

20. The processor of claim 19, wherein said decode and dispatch pipeline has a cycle length corresponding to N cycles of said clock signal.

21. A data processing system comprising:
- a central processing unit (CPU) having one or more simultaneous multithread (SMT) processors, each having an SMT mode and a single thread mode;
- a random access memory (RAM);
- an input output (I/O) adapter;
- a communications adapter;
- a bus coupling said CPU, RAM, I/O adapter, and said communications adapter;
- a shared pipeline circuit within each SMT processor for processing data for a first and second thread;
- circuitry for alternately loading an input stage of said shared pipeline circuit if said SMT mode is selected at an even clock cycle with data from said first thread and at an odd clock cycle with data from said second thread;
- circuitry for generating first data for said first thread in a pipeline stage following said input stage;
- circuitry for coupling said first data through a delay path to said input stage if said SMT mode is selected to synchronize loading said input stage with said first data during a subsequent even clock cycle; and
- circuitry for coupling said first data directly back to said input stage if said single thread mode is selected.

22. The data processing system of claim 21 further comprising:
- circuitry for loading said first data into said input stage if a feedback signal from said pipeline stage has a first logic state; and
- circuitry for loading said data from said first or second thread if said feedback signal has a second logic state.

23. The data processing system of claim 21, further comprising:
- circuitry for accessing first stored data from a cache memory corresponding to a first address data loaded into said input stage;
- circuitry for decoding said first stored data generating first or second feedback data;
- circuitry for generating said first logic state of said feedback signal if said decoding step generates said first feedback data; and
- circuitry for generating said second logic state of said feedback signal if said decoding step generates said second feedback data.

24. The data processing system of claim 21, wherein said delay path has a delay of at least one clock cycle of a clock signal controlling said shared pipeline circuit and alternately generating said even clock cycle and said odd clock cycle.

25. The data processing system of claim 24, wherein said shared pipeline circuit has a cycle length corresponding to N cycles of said clock signal.

* * * * *